United States Patent
Knight

(10) Patent No.: US 8,397,067 B1
(45) Date of Patent: Mar. 12, 2013

(54) MECHANISMS AND TECHNIQUES FOR PROTECTING INTELLECTUAL PROPERTY

(75) Inventor: Nathan G. Knight, Santa Cruz, CA (US)

(73) Assignee: Altera Corporation, San Jose, CA (US)

(*) Notice: Subject to any disclaimer, the term of this patent is extended or adjusted under 35 U.S.C. 154(b) by 406 days.

(21) Appl. No.: 12/693,223

(22) Filed: Jan. 25, 2010

Related U.S. Application Data

(63) Continuation of application No. 11/038,941, filed on Jan. 19, 2005, now Pat. No. 7,685,418.

(51) Int. Cl.
*H04L 29/06* (2006.01)

(52) U.S. Cl. ............. 713/165; 713/164; 713/150

(58) Field of Classification Search .......... None
See application file for complete search history.

(56) References Cited

U.S. PATENT DOCUMENTS

| | | | |
|---|---|---|---|
| 4,864,161 A | 9/1989 | Norman et al. | |
| 5,121,006 A | 6/1992 | Pedersen | |
| 5,258,668 A | 11/1993 | Cliff et al. | |
| 5,274,581 A | 12/1993 | Cliff et al. | |
| 5,388,157 A | 2/1995 | Austin | |
| 5,550,782 A | 8/1996 | Cliff et al. | |
| 5,790,142 A | 8/1998 | Uchinami et al. | |
| 5,835,594 A | 11/1998 | Albrecht et al. | |
| 5,970,142 A | 10/1999 | Erickson | |
| 5,978,476 A * | 11/1999 | Redman et al. | 726/4 |
| 6,904,527 B1 | 6/2005 | Parlour et al. | |
| 7,089,173 B1 | 8/2006 | Molson et al. | |
| 7,107,567 B1 | 9/2006 | Leblanc | |
| 7,234,159 B1 | 6/2007 | Fox et al. | |
| 7,484,081 B1 | 1/2009 | Langhammer et al. | |
| 7,685,418 B1 | 3/2010 | Knight | |
| 7,757,294 B1 | 7/2010 | Simkins | |
| 2001/0032318 A1 | 10/2001 | Yip et al. | |
| 2002/0024453 A1 | 2/2002 | Maeda | |
| 2002/0168067 A1 | 11/2002 | Kouzminov | |
| 2005/0071639 A1 | 3/2005 | Rodgers et al. | |
| 2007/0055911 A1* | 3/2007 | Boehm et al. | 714/31 |
| 2008/0115026 A1* | 5/2008 | Dieffenderfer et al. | 714/733 |
| 2008/0133059 A1* | 6/2008 | Trippel et al. | 700/267 |
| 2010/0333184 A1* | 12/2010 | Ooi et al. | 726/5 |
| 2011/0202901 A1* | 8/2011 | Givoni et al. | 717/125 |
| 2012/0203482 A1* | 8/2012 | Parle et al. | 702/63 |

OTHER PUBLICATIONS http://web.archive.org/web/20051208034615/http://en.wikipedia.org/wiki/Digital_Rights_Management, as printed out in year 2012 (by Applicant, then communicated to USPTO).*
Office Action mailed Sep. 15, 2008, for U.S. Appl. No. 11/038,941.
Notice of Allowance mailed Mar. 16, 2009 for U.S. Appl. No. 11/038,941.
Supplemental Notice of Allowance mailed Nov. 17, 2009 for U.S. Appl. No. 11/038,941.

(Continued)

*Primary Examiner* — David Y Jung
(74) *Attorney, Agent, or Firm* — Kwan & Olynick LLP

(57) ABSTRACT

Methods and apparatus for providing protection of pre-designed electronic components or modules ("intellectual property") provided on target hardware devices are described herein. According to various embodiments, the component and the target hardware device include mechanisms for providing a first sequence and a second sequence respectively. While the component is running on the target hardware device, a comparator accesses and compares the first sequence with the second sequence. The comparator may either be included with the component or the target hardware device. If the first and second sequences match, a function of the component is allowed to operate with the target hardware device; otherwise, the function is prevented from operating with the target hardware device. As such, unauthorized use of intellectual property can be controlled.

20 Claims, 5 Drawing Sheets

OTHER PUBLICATIONS

Digital Rights Management, Wikipedia, The Free Encyclopedia, dated Jan. 19, 2005, printed Dec. 8, 2008, http://web.archive.org/web/20050119100415/http://en.wikipedia.org/wiki/Digital_rights_management.

Laouamri, et al , "Enhancing Testability of System on Chips Using Network Management Protocols," Design, Automation and Test in Europe Conference and Exhibition 2004 Proceedings, vol. 2, Feb. 16-20, pp. 1370-1371.

Pande, et al., "High-throughput Switch-based Interconnect for Future SoCs," System-on-Chip for Real-Time Applications, 2003 Proceedings, The $3^{rd}$ IEEE International Workshop, Jun. 30-Jul. 2, 2003, pp. 304-310.

Tummala, et al., "System on Chip or System on Package?", Design & Test of Computers, IEEE, vol .16, Issue 2, Apr.-Jun. 1999, pp. 48-56.

Printed Out in Year 2008; Interface TechOnline Encyclopedia.

Printed Out in Year 2008; Digital Rights Management, Wikipedia.

Printed Out in Year 2008; JTAG, TechOnline Encyclopedia.

Printed out in Year 2008; ScanTechnology, Tech Online Encyclopedia.

U.S. Appl. No. 11/145,458, Non Final Office Action mailed Mar. 31, 2009, 13 pgs.

U.S. Appl. No. 11/145,458, Response filed Jun. 8, 2009 to Non Final Office Action mailed Mar. 31, 2009, 10 pgs.

U.S. Appl. No. 11/145,458, Final Office Action mailed Sep. 2, 2009, 9 pgs.

U.S. Appl. No. 11/145,458, Pre-Appeal Brief Request for Review filed Nov. 20, 2009, 10 pgs.

U.S. Appl. No. 11/145,458, Preliminary Amendment filed Mar. 15, 2010, 9 pgs.

U.S. Appl. No. 11/145,458, Non Final Office Action mailed Apr. 14, 2010, 10 pgs.

U.S. Appl. No. 11/145,458, Response filed Jul. 13, 2010 to Non Final Office Action mailed Apr. 14, 2010, 8 pgs.

U.S. Appl. No. 11/145,458, Final Office Action mailed Sep. 24, 2010, 10 pgs.

U.S. Appl. No. 11/145,458, Response filed Jan. 25, 2011 to Final Office Action mailed Sep. 24, 2010, 16 pgs.

U.S. Appl. No. 11/145,458, Non Final Office Action mailed Apr. 28, 2011,14 pgs.

U.S. Appl. No. 11/145,458, Response filed Aug. 29, 2011 to Non Final Office Action mailed Apr. 28, 2011, 12 pgs.

U.S. Appl. No. 11/145,458, Final Office Action mailed Oct. 18, 2011, 9 pgs.

U.S. Appl. No. 11/145,458, Pre-Appeal Brief Request for Review filed Jan. 18, 2012, 9 pgs.

U.S. Appl. No. 11/145,458, Preliminary Amendment filed Mar. 28, 2012, 9 pgs.

U.S. Appl. No. 11/145,458, Non Final Office Action mailed Aug. 20, 2012, 15 pgs.

* cited by examiner

US 8,397,067 B1

MECHANISMS AND TECHNIQUES FOR PROTECTING INTELLECTUAL PROPERTY

CROSS-REFERENCE TO RELATED APPLICATIONS

The present invention is a continuation of co-pending U.S. patent application Ser. No. 11/038,941, filed Jan. 19, 2005, all of which is incorporated herein by reference in its entirety.

BACKGROUND OF THE INVENTION

Generally, this invention relates to the protection of pre-designed logic to be embedded in electronic devices; such logic is sometimes referred to as "intellectual property" or just IP. More specifically, the invention pertains to protecting IP cores from unauthorized use.

In creating an electronic design, a user may employ one or more reusable IP cores. Generally, IP cores are pre-programmed and pre-verified functional blocks for performing defined tasks in the electronic design. In many cases, IP cores can be implemented on a target hardware device where they define at least a portion of the electronic design. IP cores can also be configurable where a user is allowed to specify one or more parameters appropriate for the electronic design. Furthermore, an electronic design automation (EDA) tool may be used for integrating IP cores into the electronic design.

Since there is a cost (e.g., time and material) associated with the development of IP cores, there is a need to protect IP cores from unauthorized use (e.g., using the IP cores in programmable technology for which it was not intended or licensed). One form of protection involves encryption of the IP cores. By encrypting the IP cores in a manner that only authorized software tools (e.g., specific EDA tools authorized by a vendor of IP cores) can decrypt, a barrier to using other software tools and programmable technology is created. Another form of protection involves licensing of IP cores for implementation in a specific programmable technology. Although each form provides some degree of protection, there is still a need to provide further protection of IP cores.

Therefore, improved techniques and mechanisms for protecting IP cores would be beneficial.

SUMMARY OF THE INVENTION

Methods and apparatus are provided for protecting intellectual property designs by preventing their unauthorized execution on hardware devices. As indicated, intellectual property may include pre-designed components of an electronic design to be implemented on a target hardware device. Such components are often implemented as programmable logic for executing various functions of the electronic design.

In one example, the protection involves use of a first sequence generator provided with the intellectual property and operable to provide a first sequence for comparing with a second sequence provided from a target hardware device. If the first sequence matches with the second sequence, a function of the component is allowed to execute on the target hardware device. However, if the first sequence does not match with the second sequence, a function of the component is prevented from executing on the target hardware device. Accordingly, the mechanisms can be used to verify that the components are authorized for use with the target hardware device. In some embodiments, the sequences are compared periodically, such as during every clock cycle.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION OF SPECIFIC EMBODIMENTS

Figure 1:
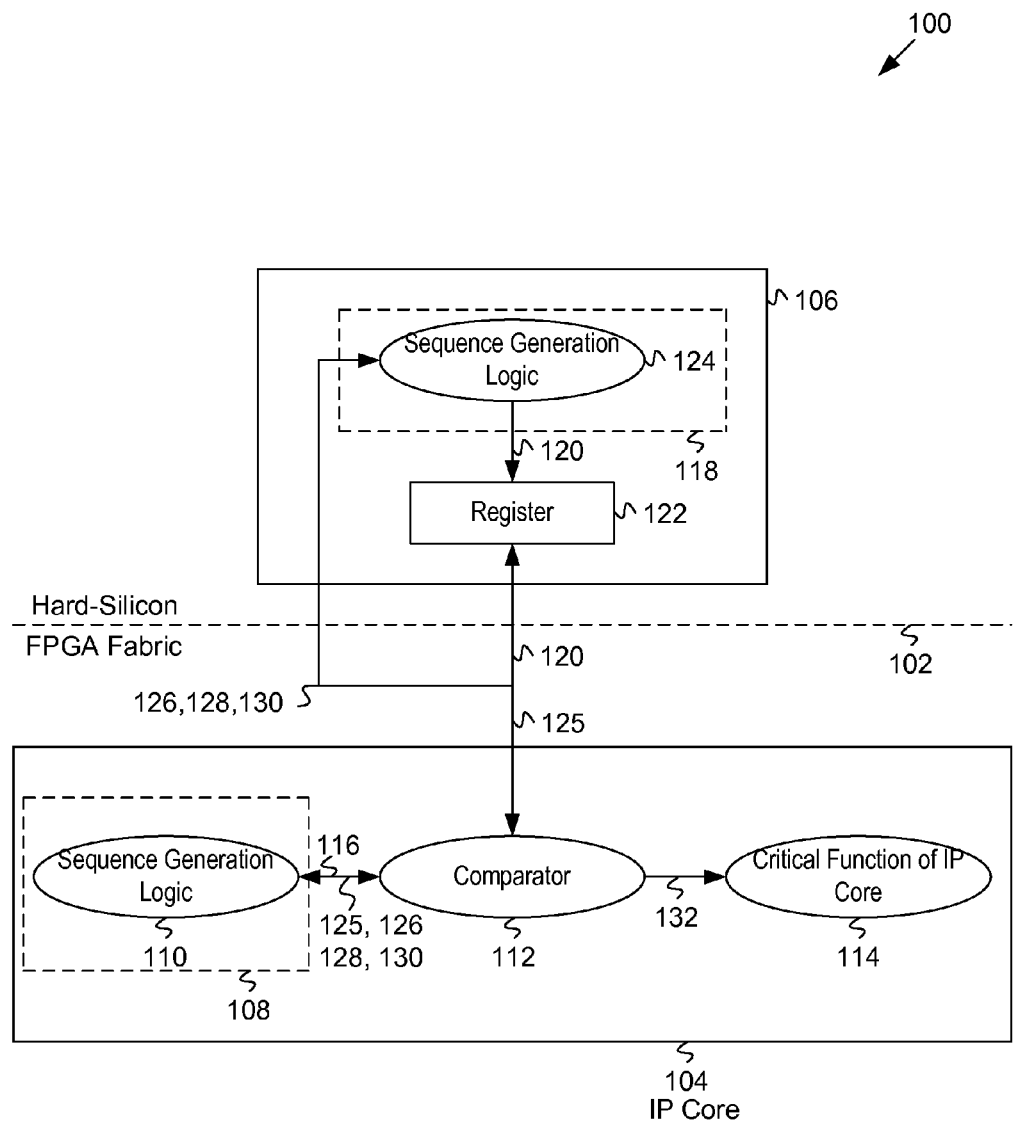
FIG. 1 is a diagrammatic representation of a protected IP core implemented on a target hardware device according to various embodiments of the present invention.

The present invention will now be described in detail with reference to a preferred embodiment thereof as illustrated in the accompanying drawings. In the following description, specific details are set forth in order to provide a thorough understanding of the present invention. It will be apparent, however, to one skilled in the art, that the present invention may be practiced without using some of the implementation details set forth herein. It should also be understood that well known operations have not been described in detail in order to not unnecessarily obscure the present invention.

Methods and apparatus for providing protection of intellectual property are described herein. In general, intellectual property can be included in an electronic design component (e.g., IP core) for implementation on a target hardware device. According to various embodiments, the component and the target hardware device include mechanisms for providing a first sequence and a second sequence respectively. While the component is running with the target hardware device, a comparator accesses and compares the first sequence with the second sequence. The comparator may either be included with the component or the target hardware device. If the first and second sequences match, a function of the component is allowed to operate with the target hardware device; otherwise, the function is prevented from operating with the target hardware device. As such, unauthorized use of intellectual property can be controlled.

The term "electronic design" generally refers to the logical structure of an electronic device such as an integrated circuit or a portion of the device. It may be implemented in hardware (usually referred to herein generically as a "target hardware device"). During the design and development effort, an electronic design may exist in various states or stages. These may include a high level Boolean representation (encoded in a hardware design language for example), a schematic or circuit representation, or any other form representing the logical arrangement of a device. In addition to the circuit structure and behavioral descriptions, the electronic design may specify other details such as floor-plan constraints, waveform constraints, timing constraints, fitting constraints, etc. At the gate level, it may exist as a netlist (whether synthesized or not) prior to placement on a target hardware device. In some cases, it may also include completed place and route assignments.

As indicated earlier, IP cores are pre-programmed and pre-verified functional blocks for performing defined tasks in the electronic design. According to various embodiments, an IP core is a predefined electronic design available to a user as a functional block for use alone or in conjunction with other components of a larger electronic design. During the design phase, a user inserts a selected IP core into his or her design, makes the necessary connections to other features of a larger electronic design, parameterizes the IP core, and compiles the entire design per the normal procedure. The resulting compiled electronic design includes the off-the-shelf IP core, parameterized as specified by the user, and possibly integrated with other components of the design in a compiled form. This design can be then used to program a programmable device (e.g., a field programmable gate array (FPGA) or programmable logic device (PLD)) or layout an application specific integrated circuit (ASIC), for example. In the context of this invention, the term "IP core" embodies various predefined off-the-shelf functional blocks used in the EDA industry.

IP cores may be viewed broadly to include "megacores," "megafunctions" and other predefined logic blocks for implementation in programmable devices. Megacores define large complex functional blocks such as microprocessors and sophisticated communications blocks such as a block for terminating a trunk protocol on a fiber optic link. Megafunctions define smaller functional blocks such as a DSP filter, multiplier, or FIFO memory. Collections or libraries of simple parameterized megafunctions are available. One example is the library of parameterized modules ("LPM") developed under the guidance of the EDIF association.

Conventionally, encrypted IP cores may be processed in a implementation software toolset (e.g., Quartus Development Toolset) and produce a file (e.g., netlist) that can be imported to a different implementation software toolset, which in turn is used to implement the encrypted IP cores into another technology (e.g., target hardware device) that the IP cores were not intended for. Such unauthorized use of IP cores can result in substantial losses for IP core vendors. Protection mechanisms are needed to minimize these losses. Therefore, aspects of the present invention provide efficient and useful protection mechanisms for verifying the unauthorized/authorized use of IP cores. Generally, protection mechanisms of the present invention can rely on specific hardware in the target hardware device in order to provide a barrier to unauthorized use of IP cores.

In one embodiment, an encrypted IP core includes a set of ports, which are recognized by a software toolset (e.g., Quartus Development Tool, available from Altera Corporation of San Jose, Calif.) being used to implement it in a target hardware device. The software toolset can automatically connect the set of ports to a hard-silicon identification module (e.g., sequence generator, register) within the target hardware device. The identification module can provide a reproducible sequence of values. During normal operations, the IP core can continually (e.g., cycle by cycle) read and compare for an expected sequence. If the expected and actual values are not equal, indicating that the IP core is not implemented in the intended FPGA technology, at least a portion of the IP core is then disabled.

FIG. 1 is a diagrammatic representation of a protected IP core 104 implemented on a target hardware device 100 according to various embodiments of the present invention. A border 102 divides target hardware device 100 into a hard-silicon portion and a FPGA fabric portion. The hard-silicon portion typically includes hardwired logic provided on all target hardware devices, independent of specific functions programmed or otherwise implemented on specific devices, whereas the FPGA fabric portion includes "soft-logic" programmed into target hardware device 100. As shown in the specific implementation of FIG. 1, IP core 104 is implemented in the FPGA fabric portion whereas an identification module 106 is implemented in the hard-silicon portion. Note that the invention is not limited to FPGA fabrics. The protected function or component may be implemented in various forms of programmable logic or even in custom gate arrays or other hard-coded logic. The critical distinction across border 102 is that the lower portion represents a custom design portion employing IP or other logic to be protected, while the upper portion represents a hardware function found on all devices and is generally not modifiable by a customer making use of the protected logic.

In general, IP core 104 includes pre-programmed programmable logic for any number of electronic design functions. IP core 104 may include a first sequence generator 108, a comparator 112, and a critical function 114. It should be noted that although comparator 112 is shown to be included in IP core 104, which is part of the FPGA Fabric portion, comparator 112 may instead be provided on the hard-silicon portion.

First sequence generator 108 is operable to provide a first sequence 116 to comparator 112. Any mechanism or technique may be used to provide first sequence 116. For example, a Pseudo-Random number generator or cryptographic hash function may be used to generate the sequence. Typically, first sequence generator 108 includes programmable sequence generation logic 110 configured to provide first sequence 116. First sequence generator 108 can also be referred to as a programmed sequence generator.

Similarly, identification module 106 includes a second sequence generator 118. Second sequence generator 118 is operable to provide a second sequence 120 either directly or indirectly to comparator 112. Any mechanism or technique may be used to provide second sequence 120. For example, a Pseudo-Random number generator or cryptographic hash function may be used to generate the sequence. According to some embodiments, second sequence generator 118 is structurally or functionally similar in design to first sequence generator 108 such that second sequence 120 matches first sequence 116. Typically, second sequence generator 118 includes un-programmed (e.g., hard-coded and unavailable to the user implementing the IP core) hardware sequence generation logic 124 for outputting second sequence 120 to either comparator 112 or an optional register 122. Register 122 is operable to temporarily store second sequence 120 and provide it to comparator 112 at any suitable time. Second sequence generator 118 can also be referred to as an unprogrammed hardware sequence generator.

In addition, first sequence 116 and second sequence 120 can be statically or dynamically derived from first sequence generator 108 and second sequence generator 118 respectively. A statically derived sequence may have the sequence fixed over a period of time (e.g., it is obtained via a look up table). On the other hand, a dynamically derived sequence may have the sequence change over the course of time (e.g., via a pseudo random value generator). In any case, first sequence 116 and second sequence 120 can provide set value inputs into comparator 112 at a given time (e.g., as will be described further below in reference to a synchronization signal and a clock signal).

Both programmable sequence generation logic 110 and un-programmed hardware sequence generation logic 124 are operable to generate respectively first sequence 116 and second sequence 120. Programmable sequence generation logic 110 and un-programmed hardware sequence generation logic 124 may use any appropriate algorithm in providing first sequence 116 and second sequence 120. The algorithm and its output sequences should not be easily comprehended by users in order to ensure that the protection mechanism is not easily defeated. According to one embodiment, the algorithm provides a sequence of pseudo random values that vary over the course of time, but in a relatively unpredictable manner. Yet, in another embodiment, the algorithm provides a predetermined fixed value. For example, un-programmed hardware sequence generation logic 124 may simply provide an assigned identification (e.g., a JTAG/IEEE 1149.1 identification) that corresponds to target hardware device 100. In such cases, second sequence 120 would be a JTAG identification and identification module 106 could include a JTAG port. E.g., sequence generation logic 124 and/or register 122 could be replaced with the JTAG port for the target hardware device.

Referring back to IP core 104, comparator 112 is operable to access first sequence 116 from first sequence generator 108 and second sequence 120 from either second sequence generator 118 or register 122. Comparator 112 may access both sequences simultaneously or sequentially. Accessing the sequences may be done in any suitable manner. For example, various signals may be exchanged between comparator 112, first sequence generator 108, and second sequence generator 118 in accessing the sequences. These signals may include a synchronization signal 126, a clock signal 128, a seed value signal 130, and any other access signals 125 between comparator 112, first sequence generator 108, and second sequence generator 118. Selection of synchronization signal 126, clock signal 128, seed value signal 130, and/or any other access signal 125 are typically dependent on the type of sequence generator (e.g., 108; 118) implemented (e.g., pseudo random number generator).

In addition, accessing first sequence 116 and second sequence 120 can occur immediately upon run-time. For instance, upon run-time, a protected IP core 104 having comparator 112 can search for identification module 106 in target hardware device 100. Once identification module 106 is found, access to first and second sequences may be performed. In one embodiment, synchronization signal 126, clock signal 128, and seed value signal 130 are sent from comparator 112 to first sequence generator 108 and second sequence generator 118. In another embodiment, no seed value signal 130 is sent if a seed value is already present in either first sequence generator 108 or second sequence generator 118. Private and public keys may be used for providing the seed value.

In order to facilitate implementation of the protection mechanisms of the present invention and to facilitate accessing first sequence 116 and second sequence 120, suitable connections can be made between various components in target hardware device 100. Generally, an implementation software toolset (e.g., an EDA tool) can automatically recognize and connect the appropriate ports of IP core 104 to identification module 106 (e.g., via second sequence generator 118 or register 122). In one embodiment, an encrypted IP core 104 uses a set of extra, possibly hidden, ports to read second sequence 120 from register 122. Typically, the user/designer employing IP core 104 in a design will not have control over these ports. The EDA tool will automatically form a connection between the relevant hardware (e.g., block 106) and the relevant portions of IP core 104 (e.g., comparator 112). Typically, sequence generation logic 110 and comparator 112 will be hidden from, or at least rendered unalterable by, the user/designer.

According to various embodiments, first sequence generator 108 and second sequence generator 118 are operable to use synchronization signals 126, clock signals 128, seed value signals 130, or any other access signals 125 in providing first sequence 116 and second sequence 120. For instance, one synchronization signal 126 can be used to begin the process of cycling through multiple values according to an algorithm (e.g., pseudo random number generator algorithm) implemented in the sequence generation logic (e.g., 110; 124). Another synchronization signal 126 can be used to stop the process of cycling where the last produced value can be input into comparator 112. Clock signal 128 can be used to coordinate the time lapse applied to both sequence generation logic. By using substantially identical clock signals 128 and synchronization signals 126 for first sequence generator 108 and second sequence generator 118, substantially identical time lapses (e.g., defined by synchronization signals 126) can be applied to both the sequence generation logics. If necessary, the sequence generation logic may also use seed values for seeding the corresponding algorithms. Regardless of the specific mechanism employed, synchronization between first sequence generator 108 and second sequence generator 118 can be realized in providing first sequence 116 and second sequence 120 that are useable by comparator 112.

In some embodiments, sequence generation logic elements in combination with synchronization signals 126, clock signals 128, and/or seed value signals 130 can provide first sequence 116 and second sequence 120 that are identical. For example, sequence generation logic elements implementing similar/identical algorithms, synchronization signals 126, clock signals 128, and seed value signals 130 can provide first sequence 116 and second sequence 120 with identical values. In other embodiments, the sequence generation logic elements in combination with synchronization signals 126, clock signals 128, and/or seed value signals 130 can provide first sequence 116 and second sequence 120 that are not identical. For example, differences in algorithms, synchronization signals 126, clock signals 128, and seed value signals 130 can provide first sequence 116 and second sequence 120 with different values.

Comparator 112 is also operable to compare first sequence 116 with second sequence 120 and determine whether a match is present. That is, comparator 112 will compare whether first sequence 116 is identical in value to second sequence 120. For instance, a match is present if first sequence 116 has a numerical value equal to that of second sequence 120. In other embodiments, a match occurs if the two sequence values, while different, are different in some defined and expected manner (e.g., one value is the complement of the other). If a match is not present, comparator 112 is further operable to prevent at least a portion of a function of IP core 114 from executing/operating within target hardware device 100. The function may be a critical function of IP core 114. In one embodiment, a disable signal 132 is generated from comparator 112 and sent to disable critical function of IP core 114. Accordingly, the mechanisms and techniques of the present invention can protect IP cores 104 from unauthorized use.

It is important to note that the protection mechanisms/techniques of the present invention can be combined with other protection mechanisms/techniques (e.g., encryption, licensing, etc.). On the other hand, the protection mechanisms/techniques of the present invention can be used alone. Furthermore, any of the protection mechanisms (e.g., sequence generator, comparator, etc.) of the present invention can be encrypted to further protect the IP core.

Figure 2:
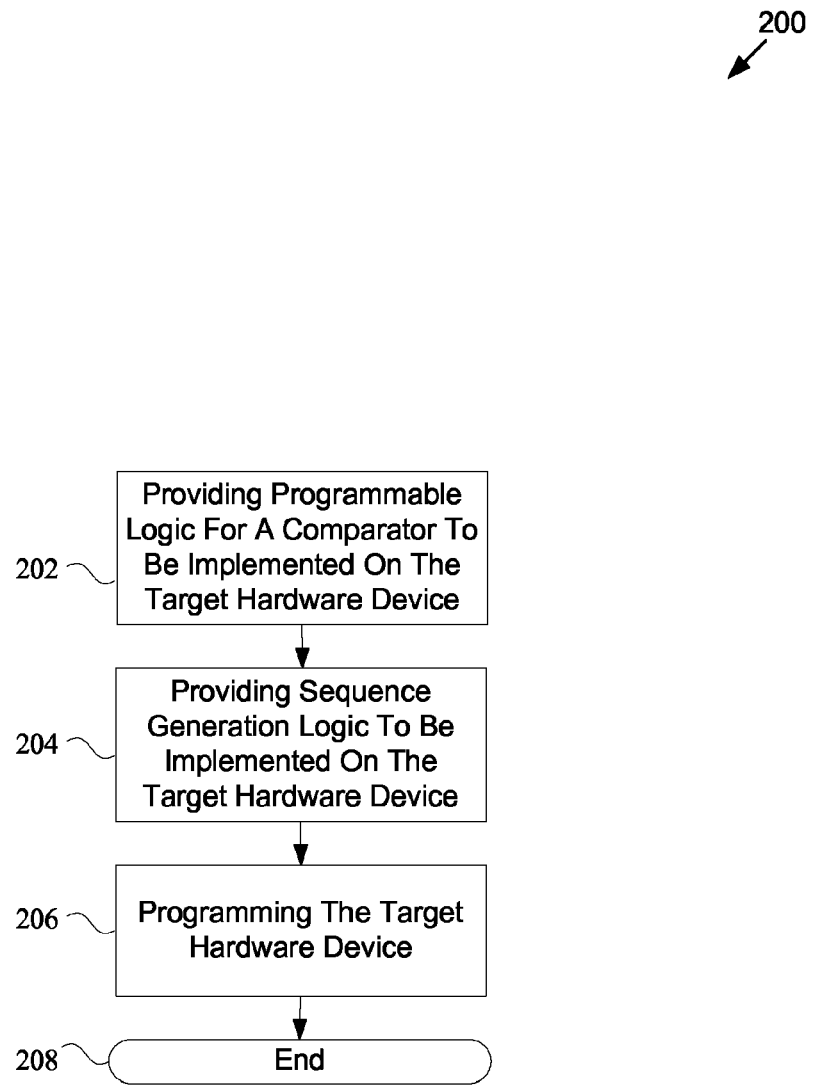
FIG. 2 is a flowchart showing how protection is provided for pre-programmed programmable logic defining a function to be implemented on a target hardware device according to a specific embodiment of the present invention.

FIG. 2 is a flowchart 200 of a method of providing protection for pre-programmed programmable logic for a function to be implemented on a target hardware device according to a specific embodiment of the present invention. The flowchart begins at an operation 202 where providing programmable logic for a comparator to be implemented on the target hardware device can be performed. The programmable logic for the comparator may be provided together with or separate from the pre-programmed programmable logic. Similarly, providing programmable sequence generation logic can next be performed in an operation 204. When implemented on the target hardware device, the programmable sequence generation logic outputs a first sequence to the comparator.

After programmable logic for the comparator and sequence generation logic are provided, the method next programs the target hardware device with the logic for the function together with the sequence generation logic and the comparator in an operation 206. The target hardware device typically includes hard coded hardware serving as a sequence generator which outputs a second sequence in a manner that allows the comparator to access the second sequence and compare it to the first sequence generated by the sequence generation logic programmed on the target hardware device. When the comparator determines that the first sequence and the second sequence do not match, execution of the function on the target hardware device is prevented. After programming the target hardware device, flowchart 200 ends at operation 208. It should be noted that any number of EDA tools may be used to facilitate in performing operations 202, 204, and 206.

In general, the sequence generation logic and the hardware sequence generator are operable to periodically provide new sequences. Upon generation, the second sequence may be provided to the comparator in any number of ways. In one embodiment, the hardware sequence generator is coupled to a register on the target hardware device adapted to receive the second sequence when output by the hardware sequence generator. The comparator is then operable to read values of the second sequence from the register. Further, the comparator is operable to periodically compare the first sequence and the second sequence. In one embodiment, the comparator compares the first sequence and the second sequence on every cycle of a clock signal.

Figure 3:
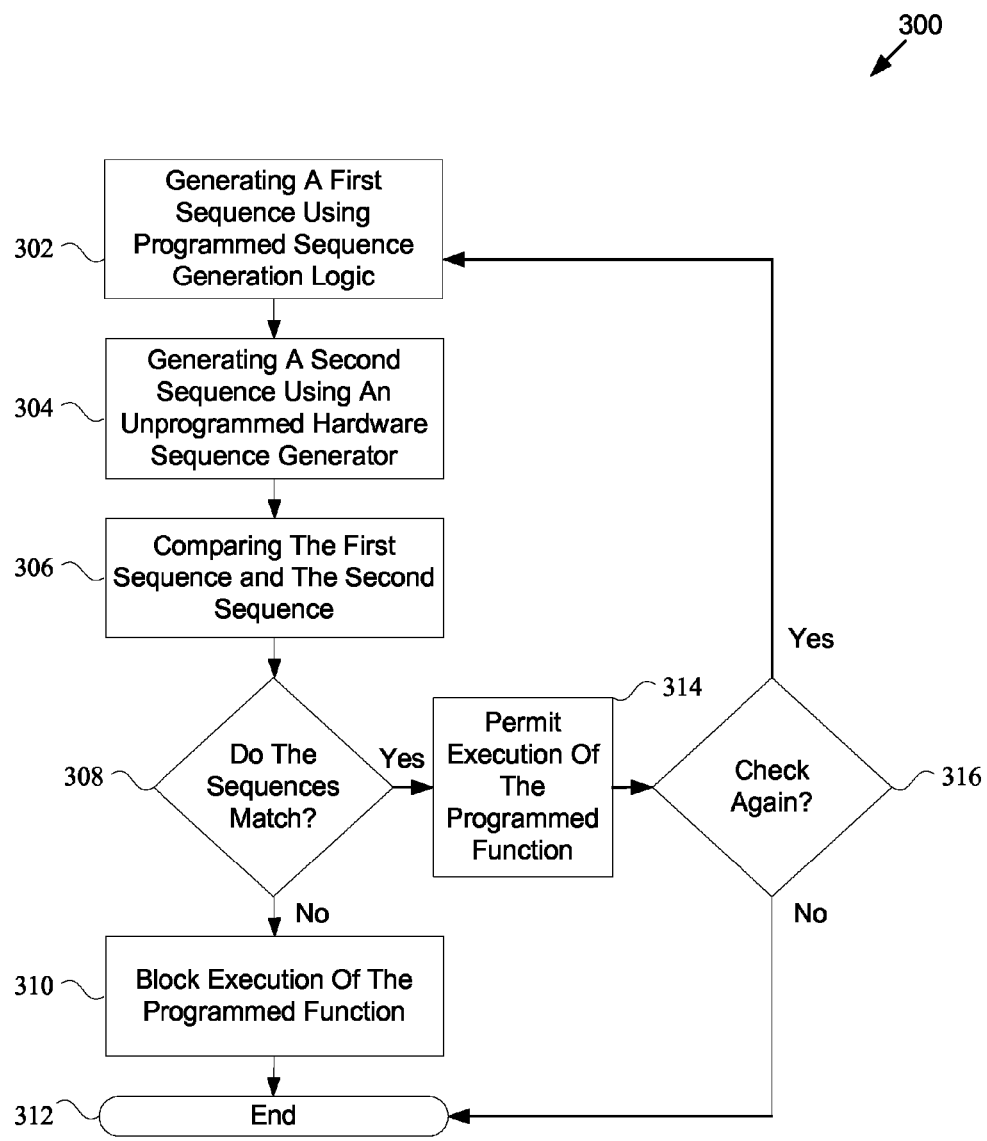
FIG. 3 is a flowchart showing how protection is provided for pre-programmed programmable logic defining a function implemented on a target hardware device according to various embodiments of the present invention.

FIG. 3 is a flowchart 300 of protecting pre-programmed programmable logic for a function implemented on a target hardware device according to various embodiments of the present invention. Beginning at operation 302, generating a first sequence using programmed sequence generation logic can be performed. As mentioned above, the sequence generation logic is operable to periodically provide new sequences.

Operation 302 may be used for assigning a first sequence to a logic component (e.g., IP core 104) programmed onto a target hardware device. Assigning the first sequence to the logic component may include generating the first sequence from a first sequence generator and/or providing the first sequence to a comparator. Generating the first sequence from the first sequence generator may include initializing the first sequence generator with a seed value. Generating the first sequence can be based on a synchronization signal, a clock signal, and/or a seed value signal. Further, the first sequence may vary over time (on a clock cycle basis for example) or may be fixed (as in the case of a JTAG identifier or fixed feature of all target hardware devices).

Next, generating a second sequence using an unprogrammed hardware sequence generator on the target hardware device can be performed in operation 304. Operation 304 may be used for assigning a second sequence to an identification module (e.g., 106) in the target hardware device. Assigning the second sequence to the identification module may include generating the second sequence from a second sequence generator and/or recording the second sequence in the identification module. Generating the second sequence from the second sequence generator may include initializing the second sequence generator with a seed value. Generating the second sequence or recording the second sequence may be based on a synchronization signal, a clock signal, and/or a seed value signal.

Assigning the first and/or second sequences can be done during run-time. However, assigning the first and/or second sequence can also be done prior to run-time. For example, as mentioned earlier, an associated algorithm may provide a predetermined fixed value for the first or second sequence.

As indicated, the hardware sequence generator may be operable to periodically provide new sequences. In one embodiment, a register is written with a sequence of numbers by hardware sequence generator (e.g., via hardware sequence generation logic 124). The sequence can be any sequence that is reproducible in the target hardware device. A longer sequence typically increases the difficulty in defeating (e.g., breaking the code/algorithm used to generate the sequence) the protection mechanisms and techniques of the present invention. However, the hardware sequence generator may also provide one fixed sequence value. In one embodiment, the second sequence is simply a JTAG identification where the identification module is a JTAG port.

After the first and second sequences are generated, they are compared in an operation 306. Here, the first and second sequences are provided to a comparator where they can be compared. The comparator may be provided in either programmed logic (e.g., within logic component) or hard coded in the target hardware device. Comparator can take the first and second sequences and compare them for an expected result/pattern.

Next, determining whether the sequences match can be performed in a decision operation 308. A match may occur when the sequences satisfy an expected result/pattern. For example, a match occurs when the first sequence value is identical to the second sequence value. As another example, a match occurs when the first sequence value is different from the second sequence value; however, the difference satisfies the expected result/pattern (e.g., when the first sequence is a complement of the second sequence or vice versa). An algorithm defining the expected result/pattern can be used for the decision operation 308.

If a match does not occur in operation 308, flowchart 300 can proceed to block execution of the programmed function in an operation 310. Any portion of the programmed function can be blocked from execution. Notification of the blocking may be provided to the user using any suitable mechanism or technique. After operation 310 has been performed, flowchart 300 ends at an operation 312. If a match does occur in operation 308, however, flowchart 300 can instead proceed to permit execution of the programmed function in an operation 314, thereby allowing the authorized use of the programmed function. Any portion of the programmed function can be permitted for execution. Notification of the grant may be provided to the user using any suitable mechanism or technique.

After operation 314, determining whether to check again for authorized use of the programmed function can be performed in a decision operation 316. If it is determined that another check is sought, flowchart 300 can proceed back to operation 302. As such, multiple checks can be realized. For example, in embodiments where the first and second sequences are provided periodically to the comparator, the comparator will be operable to periodically compare the sequences for a match. As mentioned earlier, the comparator may compare the first sequence and the second sequence for a match on every cycle of a clock signal. If no further checks are needed, flowchart 300 ends at an operation 312.

Figure 4:
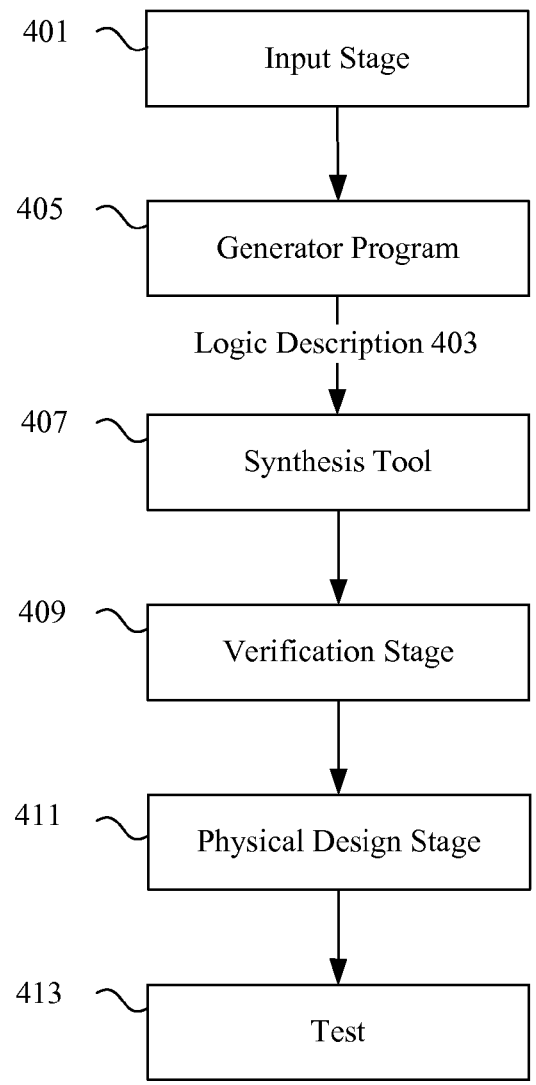
FIG. 4 is a flowchart outlining a method that may be used to implement some aspects of the invention.

FIG. 4 is a flowchart outlining a method that may be used to implement some aspects of the invention in a typical EDA environment. An input stage 401 receives selection information typically from a user for logic such as a processor core as well as other components such as a sequence generator or a comparator to be implemented on an electronic device. A generator program 405 creates a logic description and provides the logic description along with other customized logic to any of a variety of synthesis tools, place and route programs, and logic configuration tools to allow a logic description to be implemented on an electronic device.

In one example, an input stage 401 often allows selection and parameterization of components to be used on an electronic device. The input stage 401 also allows configuration of sequence generation logic. In some examples, components provided to an input stage include intellectual property functions, megafunctions, and intellectual property cores. The input stage 401 may be a graphical user interface using wizards for allowing efficient or convenient entry of information. The input stage may also be a text interface or a program reading a data file such as a spreadsheet, database table, or schematic to acquire selection information. The input stage 401 produces an output containing information about the various components selected. Note that the input stage generally will not provide the user with the ability to parameterize or modify the base functionality of sequence generation logic, comparison logic, or other feature associated with IP protection in accordance with this invention.

In typical implementations, the generator program 405 can identify the selections and generate a logic description with information for implementing the various components. The generator program 405 can be a Perl script creating HDL files such as Verilog, Abel, VHDL, and AHDL files from the component information entered by a user. According to various embodiments, the generator program 405 also provides information to a synthesis tool 407 to allow HDL files to be automatically synthesized. In some examples, a logic description is provided directly by a designer. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool.

As will be appreciated by one of skill in the art, the input stage 401, generator program 405, and synthesis tool 407 can be separate programs. The interface between the separate programs can be a database file, a log, or simply messages transmitted between the programs. For example, instead of writing a file to storage, the input stage 401 can send messages directly to the generator program 405 to allow the generator program to create a logic description. Similarly, the generator program can provide information directly to the synthesis tool instead of writing HDL files. Similarly, input stage 401, generator program 405, and synthesis tool 407 can be integrated into a single program.

A user may select various components and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 407.

A synthesis tool 407 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 409 typically follows the synthesis stage 407. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 409, the synthesized netlist file can be provided to physical design tools 411 including place and route and configuration tools. A place and route tool typically locates logic cells on specific logic elements of a target hardware device and connects wires between the inputs and outputs of the various logic elements in accordance with logic required to implement an electronic design. According to various embodiments, detection of the protected IP core and the identification module in the logic device can occur during any suitable stage such as the place and route stage. Accordingly, the protected IP core and the identification module can be automatically connected (e.g., via corresponding ports) such that communication paths are formed where signals can be exchanged there between. The device can also be physically tested at 413.

For programmable logic devices, a programmable logic configuration stage can take the output of the place and route tool to program the logic device with the user selected and parameterized components. According to various embodiments, the place and route tool and the logic configuration stage are provided in the Quartus Development Tool, available from Altera Corporation of San Jose, Calif. In a specific embodiment, the place and route operation automatically makes a connection from a hard-coded sequence generation block (and/or associated sequence storage location) on the unprogrammed target hardware device to comparator logic being placed on the device.

As noted above, different stages and programs can be integrated in a variety of manners. According to one embodiment, the input stage 401, the generator program 405, the synthesis tool 407, the verification tools 409, and physical design tools 411 are integrated into a single program. The various stages are automatically run and transparent to a user. The program can receive the user-selected components, generate a logic description depicting logic for implementing the various selected components, and implement the electronic device. As will be appreciated by one of skill in the art, HDL files and EDF files are mere examples of a logic description. Other file formats as well as internal program representations are other examples of a logic description.

Generally, embodiments of the present invention pertaining to generation and use of protected logic employ various processes or methods involving data stored in or transferred through one or more computing devices. Embodiments of the present invention also relate to an apparatus for performing these operations. For example, one embodiment is an apparatus that inserts sequence generation logic and logic for a comparator in accordance with this invention. Another embodiment is an apparatus that stores or transmits IP cores of this invention, including, for example, both the programming version of the core and the simulation model for the core.

Structurally, the apparatus may be specially constructed or it may be a general-purpose computer selectively activated or reconfigured by a computer program and/or data structure stored in the computer. The processes presented herein are not intrinsically related to any particular computer or other apparatus. Various general-purpose machines may be used with programs written in accordance with the teachings herein, or it may be more convenient to construct a more specialized apparatus to perform the required method operations. A particular structure generally representing a variety of these machines will be described below.

Figure 5:
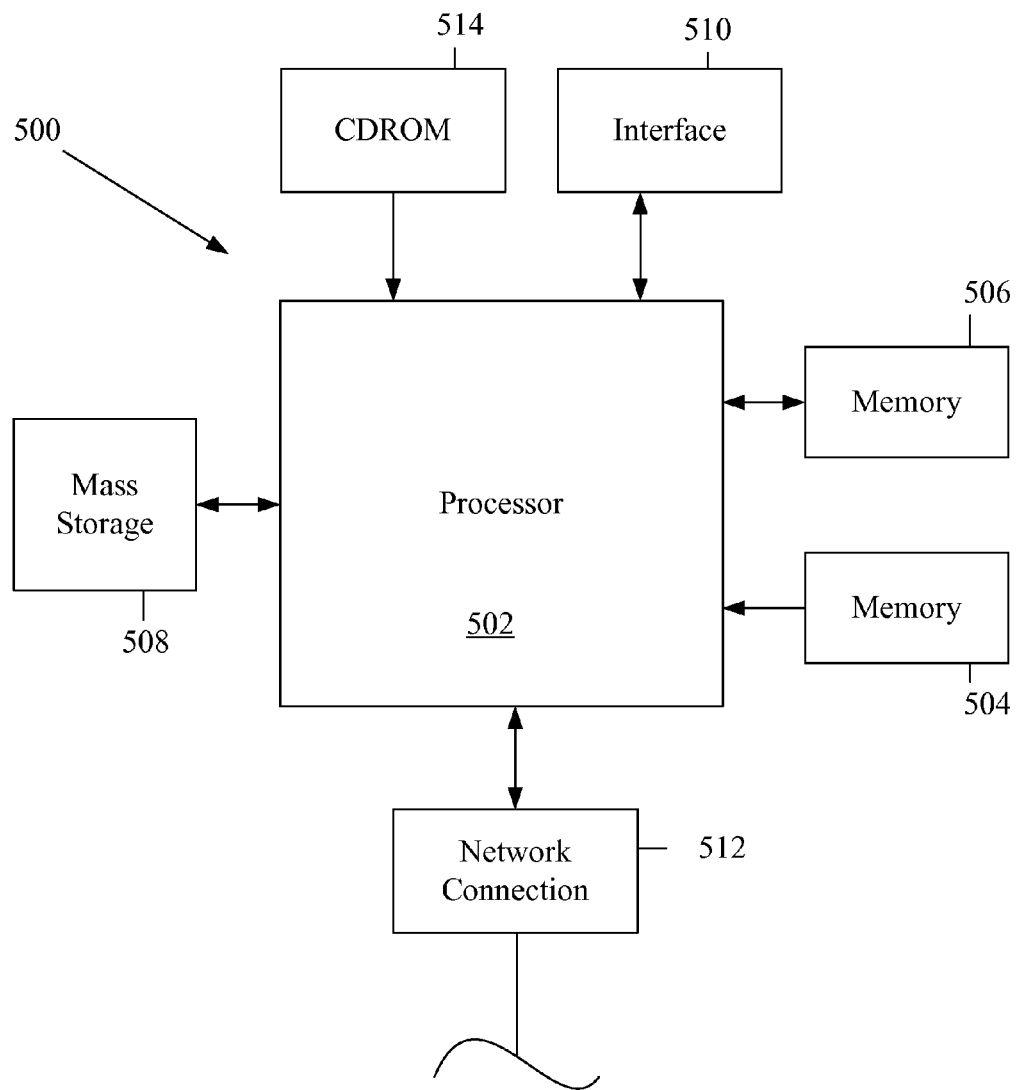
FIG. 5 is a diagrammatic representation of a computer system that can be used to implement some techniques of the present invention.

FIG. 5 is a diagrammatic representation of a computer system that can be used to implement a programmable device having an IP core with protection mechanisms configured according to various embodiments of the present invention. The computer system 500 includes any number of processors 502 (also referred to as central processing units, or CPUs) that are coupled to devices including memory 506 (typically a random access memory, or "RAM"), memory 504 (typically a read only memory, or "ROM"). As is well known in the art, memory 504 acts to transfer data and instructions uni-directionally to the CPU and memory 506 is used typically to transfer data and instructions in a bi-directional manner.

Both of these memory devices may include any suitable type of the computer-readable media. A mass storage device 508 is also coupled bi-directionally to CPU 502 and provides additional data storage capacity and may also include any suitable type of computer-readable media. The mass storage device 508 may be used to store programs, data and the like and is typically a secondary storage medium such as a hard disk that is slower than memory. The mass storage device 508 can be used to hold a library or database of prepackaged logic or intellectual property functions, as well as information on generating particular configurations. It will be appreciated that the information retained within the mass storage device 508, may, in appropriate cases, be incorporated in standard fashion as part of memory 506 as virtual memory. A specific mass storage device such as a CD-ROM 514 may also pass data uni-directionally to the CPU.

CPU 502 is also coupled to an interface 510 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 502 optionally may be coupled to a computer or telecommunications network using a network connection as shown generally at 512. With such a network connection, it is contemplated that the CPU might receive information from the network, or might output information to the network in the course of performing the above-described method steps. It should be noted that the system 500 may also be associated with devices for transferring completed designs onto a programmable device. The above-described devices and materials will be familiar to those of skill in the computer hardware and software arts.

Aspects of the present invention provide many advantages. One advantage is that the sequence generators and the comparator can add another level of protection to intellectual property while utilizing very few resources. For example, a FPGA silicon hardware operable to generate very long reproducible sequence of numbers is generally small relative to the overall FPGA size. Likewise, the logic required in the IP core to generate the same sequence of numbers and to compare them is also small relative to the overall IP core. Further, by hiding the relevant signals of the protection mechanisms from the user, it is difficult for the user to determine the algorithm that generates the numbers and reproduce it in order to defeat the protection mechanisms/techniques of the present invention.

Although many of the components and processes are described above in the singular for convenience, it will be appreciated by one of skill in the art that multiple components and repeated processes can also be used to practice the techniques of the present invention. While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

What is claimed is:

1. A method comprising:
   generating a first sequence using a first sequence generator;
   assigning the first sequence to a logic component implemented on a target hardware device;
   generating a second sequence using a second sequence generator, wherein the second sequence generator is hard-coded;
   assigning the second sequence to an identification module implemented on the target hardware device; and
   blocking a function associated with the logic component if the first sequence does not correspond to the second sequence, wherein the first sequence and the second sequence are assigned before or during run-time.

2. The method of claim 1, wherein generating the first sequence comprises initializing a first sequence generator with a first seed value.

3. The method of claim 1, wherein the first sequence and the second sequence vary over time in a predefined manner.

4. The method of claim 1, wherein generating the second sequence comprises initializing a second sequence generator with a second seed value.

5. The method of claim 1, wherein the first sequence and the second sequence are assigned during run-time.

6. The method of claim 1, wherein the first sequence and the second sequence are assigned prior to run-time.

7. The method of claim 1, wherein the second sequence is a JTAG identification and the identification module is a JTAG port.

8. The method of claim 1, wherein the first sequence does not correspond to the second sequence if the first sequence does not match the second sequence.

9. The method of claim 1, wherein assigning the second sequence comprises writing the second sequence to a register implemented on the target hardware device.

10. The method of claim 1, wherein the first sequence is generated using programmable logic and the second sequence is generated using hard-coded logic.

11. A device comprising:
- a first sequence generator operable to generate a first sequence and assign the first sequence to a logic component implemented on the device before or during run-time;
- a second sequence generator operable to generate a second sequence and assign the second sequence to an identification module implemented on the device before or during run-time, wherein the second sequence generator is hard-coded; and
- a comparator module operable to block a function associated with the logic component if the first sequence does not correspond to the second sequence.

12. The device of claim 11, wherein the first sequence generator and the second sequence generator are further operable to vary the first sequence and the second sequence over time in a predefined manner.

13. The device of claim 11, wherein the first sequence generator and the second sequence generator are operable to assign the first sequence and the second sequence during run-time.

14. The device of claim 11, wherein the first sequence generator and the second sequence generator are operable to assign the first sequence and the second sequence prior to run-time.

15. The device of claim 11, wherein the second sequence is a JTAG identification and the identification module is a JTAG port.

16. The device of claim 11, wherein the first sequence does not correspond to the second sequence if the first sequence does not match the second sequence.

17. The device of claim 11, wherein assigning the second sequence comprises writing the second sequence to a register implemented on a target hardware device.

18. A system comprising:
- a logic component; and
- an identification module;
- a first sequence generator operable to generate a first sequence and assign the first sequence to the logic component before or during run-time; and
- a second sequence generator operable to generate a second sequence and assign the second sequence to the identification module before or during run-time, wherein the second sequence generator is hard-coded, wherein a function associated with the logic component is blocked if the first sequence does not correspond to the second sequence.

19. The system of claim 18, wherein the first sequence generator and the second sequence generator are operable to vary the first sequence and the second sequence over time in a predefined manner.

20. The system of claim 18, wherein the first sequence generator and the second sequence generator are operable to assign the first sequence and the second sequence during run-time.

* * * * *